May 19, 1942.　　M. HOFFELD ET AL　　2,283,734
ELECTRICALLY HEATED RECEPTACLE
Filed Oct. 24, 1938
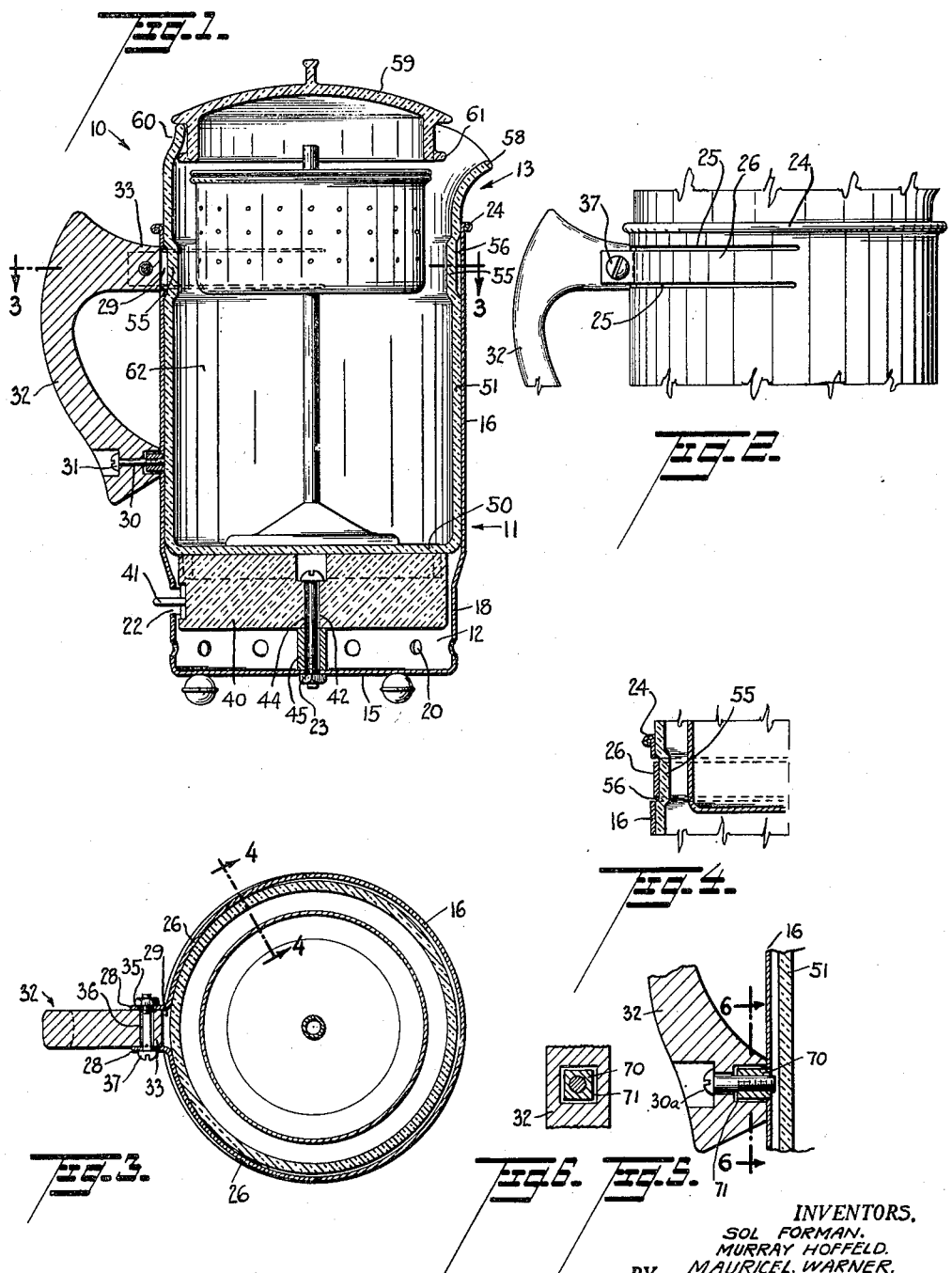
INVENTORS.
SOL FORMAN.
MURRAY HOFFELD.
MAURICEL. WARNER.
BY J.B. Felshin
ATTORNEY Patented May 19, 1942

2,283,734

UNITED STATES PATENT OFFICE 2,283,734

ELECTRICALLY HEATED RECEPTACLE

Murray Hoffeld, Brooklyn, Sol Forman, New York, and Maurice L. Warner, Brooklyn, N. Y., assignors to Forman Brothers, Inc., Brooklyn, N. Y., a corporation of New York Application October 24, 1938, Serial No. 236,700

9 Claims. (Cl. 65—61)

This invention relates to electrically heated receptacles for liquids, such as coffee percolators, teapots, water heaters, and the like articles.

An object of this invention is to provide an electrically heated receptacle of the character described, such as a coffee percolator, water heater, teapot, or the like article, which may be placed on a table and attached to an electric outlet or socket, and comprising a metallic holder at the bottom of which is attached and electric heater, and which may receive a non-metallic receptacle such as a complete percolator unit or glass pot, the holder being provided with a handle, whereby the holder and receptacle may be lifted together for pouring liquids from the receptacle.

Another object of this invention is to provide in an article of the character described, highly improved means on the metallic holder or shell for holding the receptacle against accidently slipping out of the holder or shell, said holding means being releasable to permit removal of the receptacle for cleaning, or replacement.

Yet another object of this invention is to provide an article of the character described, comprising a holder having a bottom wall and provided with an electric heater, attached to the bottom wall of the holder by a single bolt, and a receptacle within the holder having a bottom wall covering the top of said heater.

Still another object of this invention is to provide in an article of the character described, a holder provided with a handle, and a glass receptacle in the holder, the receptacle being provided with an annular external groove, and the holder being provided with split bands extending into the groove to hold the receptacle in the holder, the adjacent split ends of the bands being connected to the upper end of the handle, and the lower end of the handle being swingably mounted on the holder, whereupon by disconnecting said ends of the bands from the handle to release the receptacle, the handle may swing downwardly about its lower end.

Yet another object of this invention is to provide a strong, rugged, compact and durable heated receptacle of the character described, which shall be relatively inexpensive to manufacture, easy to assemble and clean, which shall yet be attractive in appearance, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is an axial, elevational, cross-sectional view of an electrically heated receptacle, embodying the invention;

Fig. 2 is a partial, side elevational view of a portion of said article;

Fig. 3 is a cross-sectional view taken on line 3—3 of Fig. 1;

Fig. 4 is a cross-sectional view taken on line 4—4 of Fig. 3;

Fig. 5 is an elevational, cross-sectional view through the bottom of the handle, illustrating a modified construction; and Fig. 6 is a cross-sectional view taken on line 6—6 of Fig. 5.

Referring now in detail to the drawing, 10 designates an electrically heated pot or receptacle, or the like article, embodying the invention, here shown for the purpose of illustration in the form of an electric coffee percolator.

The article 10 comprises generally of a metallic holder 11, an electric heating element 12 at the bottom of the holder, and a non-metallic receptacle 13 within the holder and over the heating element.

The holder 11 may be made of sheet metal and comprises a bottom wall 15 and an upwardly extending cylindrical wall 16. The bottom portion 18 of the cylindrical wall 16, may be of somewhat constricted diameter. The portion 18 of the wall 16, is formed with a plurality of annularly spaced openings 20, adjacent the bottom wall 15, and with an enlarged opening 22, above the openings 20, for the purpose hereinafter appearing.

At the center of the bottom wall 15 is a through opening 23. The upper edge of the cylindrical wall 16 may be beaded outwardly, as at 24. The cylindrical wall 16 is formed somewhat below said beaded upper edge 24, with a pair of parallel, horizontal, aligned, semi-annular slits or cuts 25, and the metal between the cuts 25 is centrally split to form a pair of similar, symmetrically disposed quarter annular bands or straps 26. The free, adjacent inner ends of the bands are bent outwardly to form a pair of parallel, spaced tabs or ears 28, leaving a space or opening 29 in the cylindrical wall 16, between said tabs.

Fixed to the cylindrical wall 16, directly below the opening 29 is a horizontal, radially extending pivot pin 30, having a head 31 at its outer end.

Pivotally mounted on the pivot pin 30 is the lower end of a handle 32, aligned with opening 22. The upper end 33 of the handle is interposed between the parallel tabs or ears 28. Said ears 28 are formed with perforations 35, and the upper end 33 of the handle 32, is formed with a horizontal through opening 36, registering with the perforations 35. Extending through the perforations 35 and the through opening 36, is a bolt 37 for fixing the upper end of the handle to the ears 28.

It will be noted that when the tabs or ears 28 are attached to the handle, the width of the space 29 is less than the combined lengths of the two ears, so that when the tabs 28 are moved inwardly toward each other into contact with the opposite sides of the handle, the bands or straps 26 will move inwardly of the cylindrical wall 18, as shown in Figs. 3 and 4, for the purpose hereinafter appearing.

The handle is held from coming off the pivot pin 30 by the head 31 of the latter, as shown in Fig. 1 of the drawing.

The heating element 12 may be of usual construction, and comprises a circular flat porcelain block or disc 40, having grooves in its upper surface for the usual resistance wires, and a pair of terminal prongs 41 projecting through the opening 22 in the holder. The disc 40 may be formed with a central, vertical through opening 42 to receive a bolt 44 passing through the opening 23 in the bottom wall 15. A sleeve 45 surrounding the bottom end of the bolt may be interposed between the bottom wall 15 of the holder and the disc 40, to support the disc in raised position above the openings 20. It will be noted that the single bolt 44 attaches the heating element or unit to the bottom of the holder.

The pot or receptacle 13 may be made of heat resisting glass, such as Pyrex. The same has a flat bottom wall 50 and an upwardly extending cylindrical wall 51. Said receptacle may rest on the porcelain disc 40 to cover the heating coils. Said receptacle is formed with an annular inwardly pressed portion 55, forming an annular groove 56, aligned with the bands 26. When the bands are attached to the handle, said bands will project into the groove 56 to retain the receptacle in the holder and to prevent said receptacle from accidentally slipping out of the holder.

The receptacle 13 may be formed with a spout 58 and provided with a cover 59. The upper edge of the receptacle may be constricted, as at 60, and provided with a pair of outwardly extending tabs 61 to engage beneath the constricted portion 60 for holding the cover on the receptacle. Usual percolating apparatus 62, may be placed within the receptacle 13.

It will now be noted that the article 10 may be placed on the table and connected to an electric outlet by means of an electric cord or connector attached to the prongs 41. Coffee may be percolated by means of the article 10 on the table, and by grasping the handle 32, the holder may be lifted together with the receptacle 13, for pouring liquid.

The receptacle 13 may be removed for cleaning or replacement by merely removing the bolt 37 to permit the bands 26 to be spread apart out of the groove 56.

As shown in the drawing, the holder may be vided with small legs of heat insulating material.

Although the invention is shown in the drawing embodied in a coffee percolator, it will be understood that the percolating apparatus 62 may be removed, and the article 10 used for heating water, or brewing tea or cooking.

As shown in Figs. 5 and 6 of the drawing, the handle 32 may be fixed to the holder against swinging movement when the bolt 37 is removed. To this end, as shown in Fig. 5, there is fixed to the cylindrical wall 16 of the holder, a horizontal radial threaded pin 30a, carrying a non-circular nut 70, screwed to said pin. The bottom of the handle 32 may be formed with a non-circular socket 71, receiving the nut 70 and preventing rotation of the handle about the pin 30a, when the bolt 37 is removed.

It will now be understood that the invention herein covers a unitary article comprising a metallic holder having a handle and provided with an electric heating unit therein adapted to be attached to an electric cord connector, and a pot or receptacle of vitreous material, such as glass, telescoped within the holder, within which coffee or tea may be prepared and brewed or water boiled, the construction being such that the whole article with the heating unit may be lifted by the handle and tilted for pouring liquid from the pot.

The improved article includes means to retain the pot or the receptacle within the holder against accidentally slipping out when the article is tilted for pouring, the construction being such that the pot may nevertheless be readily removed for cleaning. As shown in the drawing, the metallic shell or holder receives the major portion of the pot of glass or other vitreous material for protecting the latter against breakage, the handle being fixed to the holder which is more adapted to have the handle on it, and only the upper spouted end of the pot projecting above the holder, whereby said upper end may be grasped to facilitate removal of the pot from the holder.

The heater is within the bottom of the shell or holder, and the receptacle within the holder has an imperforate bottom wall resting directly on the heater to get a better transfer of heat, and whereby the heater holds the receptacle at a predetermined height and supports the weight of the receptacle, even when the latter is full of water, the weight of the receptacle thus being on the heater and not on the strips 26 or on the cylindrical wall of the holder, so that neither said strips nor the holder need tightly grip the glass receptacle, the construction being such further to permit the receptacle to be rotated about its axis, whereby the spout on the receptacle may be at any angle so that liquid may be poured from the receptacle at various angles.

Heretofore, vitreous pots for electric coffee percolators were usually made with a hole in the bottom to receive a heating element, and the heating element was permanently fixed to the pot. In the present construction, the bottom of the pot is imperforate and it is not necessary to make a hole in the pot. Furthermore, the pot is removable from the holder and heater for the purpose of cleaning, and this construction gives longer life to the pot; and the holder, heating unit and pot are nevertheless one unitary article.

It will be noted that the glass receptacle has an annular external groove to receive the strips 26 which serve to hold the receptacle in the holder and on the heating unit, and permit the receptacle to be rotated to various angles, said strips serving to hold the receptacle in any angular position to which it may be moved and also prevent the receptacle from accidentally slipping out of the holder in any angular position of the receptacle.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. In combination, a sheet metal holder, a receptacle in said holder, said receptacle being formed with an annular groove on the outer surface thereof, and said holder being formed with a pair of horizontal cuts, the metal between said cuts being slit vertically to form a band having a free end, said band extending inwardly into said groove, and releasable means for fixing the free end of said band to said holder, for retaining said band in said groove to hold the receptacle in the holder.

2. In combination, a metallic holder having a bottom wall, and a cylindrical upstanding wall, a non-metallic receptacle in said holder, the upper end of said receptacle projecting above said holder, said receptacle being formed with an annular groove on the outer surface thereof located below the upper end of the holder, said holder being formed with a pair of similar, symmetrically disposed, substantially quarter annular integral straps cut from the cylindrical wall, said straps having substantially parallel outwardly extending ears at the inner adjacent ends thereof, a handle on said holder, said handle having a through opening, said ears contacting opposite sides of said handle and being formed with perforations registering with said through opening, a fastening member passing through said through opening, and perforations for attaching said ears to said handle, said straps extending inwardly of said cylindrical wall and projecting into said annular groove to retain said receptacle within said holder.

3. In combination, a holder having an upstanding wall, a receptacle in said holder, said receptacle being formed with a groove in the outer surface thereof, a handle on said holder, said holder being formed with a pair of symmetrically disposed integral straps cut from the cylindrical wall, means for attaching the adjacent ends of said straps to said handle, and said straps having portions extending into said groove to retain said receptacle within said holder.

4. An article of the character described, comprising a holder, a receptacle of vitreous material within said holder formed with a depression in its outer surface and below the upper edge thereof, and provided with a pouring spout, a handle fixed to said holder, said article being adapted to be lifted as a whole by means of the handle and tilted for pouring liquid from said receptacle, and means on said holder engaging said receptacle and projecting into said depression, to prevent said receptacle from accidentally falling out of the holder, when said article is lifted and tilted for pouring.

5. An article of the character described comprising a holder, a cylindrical receptacle of vitreous material within said holder, said receptacle being formed with a pouring spout at its upper end, and with an annular external groove below its upper end, a handle fixed to said holder, said article being adapted to be lifted as a whole by means of the handle and tilted for pouring liquid from said receptacle, and means on said holder, and below the upper end thereof projecting into said groove, engaging said receptacle to prevent said receptacle from accidentally falling out of the holder when tilting said article for pouring, the major portion of said receptacle being disposed within said holder, and the upper portion of said receptacle projecting above said holder, whereby said upper portion of the receptacle may be grasped for pulling the receptacle out of the holder.

6. An article of the character described, comprising a metallic holder having a bottom wall and an annular upstanding wall, a glass receptacle within said holder, said receptacle being open at the top, and formed with a depression in its outer surface, below the upper edge thereof, said depression being located below the upper end of the holder, and the major portion of the receptacle being disposed within said holder, a handle fixed, at least at one point, to the upper portion of said holder, and said article being adapted to be lifted by means of the handle and tilted for pouring liquid from said receptacle, and means on said holder engaging the bottom of the depression to retain said receptacle from accidentally falling out of the holder when said article is tilted for pouring, said means being retractable out of said depression to permit removal of said receptacle from said holder.

7. An article of the character described, comprising a metallic holder having a bottom wall and an annular upstanding wall, a glass receptacle within said holder, said receptacle being open at the top and formed with an annular groove in its outer surface, said groove being disposed below the upper edge of said receptacle and below the upper end of the holder, the major portion of the receptacle being disposed within said holder, a handle fixed, at least at one point, to the upper portion of said holder, said receptacle being adapted to be lifted by means of the handle and tilted for pouring liquid from said receptacle, and means on said holder engaging the bottom of said groove to retain said receptacle from accidentally falling out of the holder, when said article is tilted for pouring, said means being retractable out of said groove to permit removal of said receptacle from said holder.

8. An article of the character described, comprising a metallic holder having a bottom wall, and a cylindrical upstanding wall, a glass receptacle telescoped within said holder, said receptacle having an imperforate bottom wall and a cylindrical upstanding wall, concentric with the cylindrical wall of the holder, the cylindrical wall of said receptacle being formed with an annular external groove disposed below the upper edge of said receptacle and below the upper end of said holder, and means on the holder projecting into the groove, to prevent the receptacle from accidentally falling out of the holder, the upper end of said receptacle being open, and formed with a pouring spout, and said receptacle projecting above the upper end of the holder, whereby the projecting portion of the receptacle may be grasped to pull the receptacle out of the holder.

9. An article of the character described, comprising a metallic holder having a bottom wall, and a cylindrical upstanding wall, a glass receptacle telescoped within said holder, said receptacle having an imperforate bottom wall and a cylindrical upstanding wall, concentric with the cylindrical wall of the holder, the cylindrical wall of said receptacle being formed with an annular external groove disposed below the upper edge of said receptacle and below the upper end of said holder and means on the holder projecting into the groove, to prevent the receptacle from accidentally falling out of the holder, the upper end of said receptacle being open, and formed with a pouring spout, and said receptacle projecting above the upper end of the holder, whereby the projecting portion of the receptacle may be grasped to pull the receptacle out of the holder, said handle being attached to the holder, at least at one point, closer to the top than to the bottom of the holder, said means being retractable out of said groove to permit removal of the receptacle from said holder.

MURRAY HOFFELD.
SOL FORMAN.
MAURICE L. WARNER.